US008601194B2

(12) United States Patent
Tsirkin

(10) Patent No.: US 8,601,194 B2
(45) Date of Patent: Dec. 3, 2013

(54) ON-DEMAND INTERRUPT VECTOR ALLOCATION BASED ON ACTIVITY DETECTION

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 311 days.

(21) Appl. No.: 13/022,940

(22) Filed: Feb. 8, 2011

(65) Prior Publication Data

US 2012/0203947 A1 Aug. 9, 2012

(51) Int. Cl.
*G06F 13/32* (2006.01)
*G06F 13/24* (2006.01)

(52) U.S. Cl.
USPC .......................... 710/269; 710/260; 710/261

(58) Field of Classification Search
USPC .......................... 710/269, 260, 261
See application file for complete search history.

(56) References Cited

U.S. PATENT DOCUMENTS

| | | | | |
|---|---|---|---|---|
| 5,623,674 A | * | 4/1997 | Pedrizetti | 710/260 |
| 5,671,365 A | * | 9/1997 | Binford et al. | 710/100 |
| 6,098,143 A | * | 8/2000 | Humpherys et al. | 710/260 |
| 6,601,122 B1 | * | 7/2003 | Broberg et al. | 710/266 |
| 6,738,847 B1 | * | 5/2004 | Beale et al. | 710/260 |
| 6,877,057 B2 | * | 4/2005 | Alexander et al. | 710/263 |
| 7,444,639 B2 | * | 10/2008 | Jahnke | 718/105 |
| 7,634,589 B2 | * | 12/2009 | Anand et al. | 710/15 |
| 7,802,038 B2 | * | 9/2010 | Bedwell et al. | 710/110 |
| 7,962,679 B2 | * | 6/2011 | van de Ven | 710/261 |
| 8,051,234 B2 | * | 11/2011 | Takata et al. | 710/268 |
| 8,255,604 B2 | * | 8/2012 | Alapati et al. | 710/269 |
| 8,296,490 B2 | * | 10/2012 | Li et al. | 710/260 |
| 8,463,971 B2 | * | 6/2013 | Solomita et al. | 710/267 |
| 2002/0116563 A1 | * | 8/2002 | Lever | 710/260 |
| 2005/0276092 A1 | * | 12/2005 | Hansen et al. | 365/149 |
| 2007/0234298 A1 | * | 10/2007 | Hirai et al. | 717/124 |

OTHER PUBLICATIONS

"Message Signaled Interrupts", Printed from Internet on Feb. 1, 2011—http://en.wikipedia.org/widi/Message_Signaled_Interrupts, 2 pp.

* cited by examiner

*Primary Examiner* — Paul R Myers
*Assistant Examiner* — Christopher A Daley
(74) *Attorney, Agent, or Firm* — Lowenstein Sandler LLP

(57) ABSTRACT

A method and system for dynamically allocating interrupt vectors on demand. A computer system measures a rate of activities associated with an event. Based on the rate of activities, the computer system determines whether to allocate a dedicated interrupt vector to the event. The rate of activities can be an interrupt request (IRQ) rate.

22 Claims, 6 Drawing Sheets

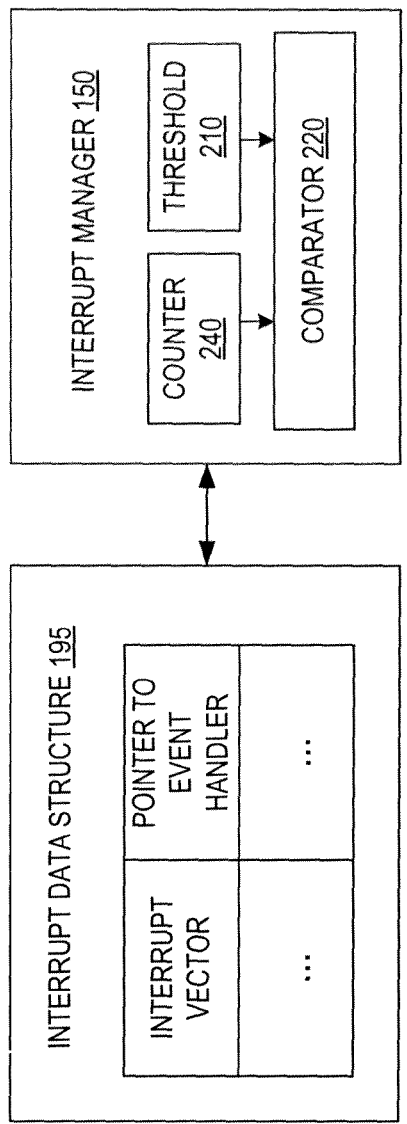
FIG. 2A
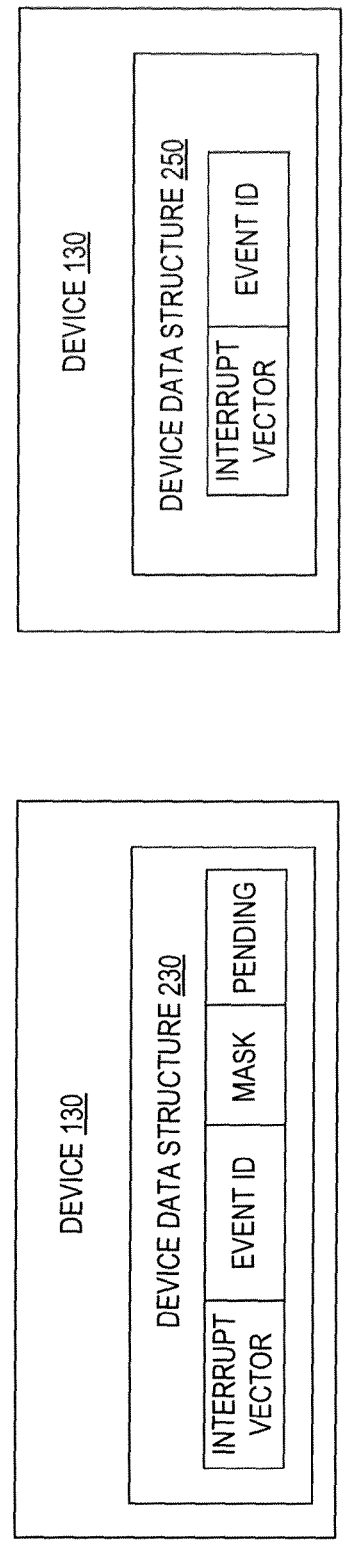
FIG. 2C
FIG. 2B

ON-DEMAND INTERRUPT VECTOR ALLOCATION BASED ON ACTIVITY DETECTION

TECHNICAL FIELD

Embodiments of the present invention relate to a computer system, and more specifically, to management of interrupts in a computer system.

BACKGROUND

An interrupt indicates that a condition exists in a computer system and requires the attention of a processor. When an interrupt (or, equivalently "event") occurs, the source of the interrupt (e.g., a device, such as a hardware device or a software device) sends an interrupt request (IRQ) to the processor. An IRQ can be sent by means of interrupt messages (e.g., Message Signaled Interrupts (MSI-X)), changes to a voltage level on interrupt pins (e.g., pin-based interrupts), and/or other means.

A computer system generally includes multiple devices, and some devices can trigger multiple different events. A device can be programmed to generate different IRQs that identify the occurrences of different events. In a computer system that uses MSI-X, an MSI-X table stored in a device can be programmed with a number of interrupt vectors. When the device sends an IRQ to signal the occurrence of an event, the IRQ is sent with an interrupt vector assigned to the event. The interrupt vector is used by a system handler to locate the code that handles the event.

However, the total number of interrupt vectors that can be assigned to events is limited. In a personal computer system, the total number of interrupt vectors is typically limited by a number of factors, such as the amount of memory needed to track different IRQs in the operating system, the number of different interrupt input lines on a Programmable Interrupt Controller (PIC), or other factors.

Some conventional computer systems support interrupt vector sharing, allowing the same interrupt vector to be used to report multiple different events. The sharing allows a computer system to use a small number of interrupt vectors to report a large number of events to the processor. Conventional computer systems allocate the interrupt vectors statically at device initialization or system startup time. Upon detection of an event, the computer system polls each device and event type that shares the same interrupt vector to verify which event has taken place. Device polling at runtime increases the overhead for interrupt handling and degrades the performance of the system.

BRIEF DESCRIPTION OF THE DRAWINGS

The present invention is illustrated by way of example, and not by way of limitation, and can be more fully understood with reference to the following detailed description when considered in connection with the figures in which:

FIG. 2A is a block diagram of an interrupt manager and an interrupt data structure.

FIGS. 2B and 2C illustrate two alternative embodiments of a device data structure.

DETAILED DESCRIPTION

Described herein is a method and system for dynamically allocating interrupt vectors on demand. In one embodiment, a computer system measures a rate of activities associated with an event. Based on the rate of activities, the computer system determines whether to allocate a dedicated interrupt vector to the event. In one embodiment, the rate of activities is an interrupt request (IRQ) rate.

Embodiments of the present invention allow multiple events to efficiently share the same interrupt vector. A computer system can have a large number of devices and each device can trigger one or more events. When the total number of different kinds of events exceeds the total number of assignable interrupt vectors, some of the events may need to share the same interrupt vector. To reduce runtime overhead of determining which event generates an IRQ associated with a shared interrupt vector, embodiments of the present invention allocate interrupt vectors on demand based on the rate of activities of each event (e.g., the rate at which each event causes IRQs to be sent). Thus, events having a high rate of activities can be assigned dedicated interrupt vectors. As a result, runtime overhead can be reduced.

In one embodiment, events that cause a large number (i.e., a high rate) of IRQs are allocated with dedicated interrupt vectors. Events that cause a small number (i.e., a low rate) of IRQs are allocated with shared interrupt vectors. In one embodiment, when the IRQ rate of an event decreases, the event is assigned to share an interrupt vector with a larger number of events. When the IRQ rate of an event increases, the event is assigned to share an interrupt vector with a smaller number of events.

In one embodiment, an event may be given a priority according to the rate of IRQs that it causes to be sent. In one embodiment, a low-IRQ-rate event can be masked, such that the delivery of the IRQs is delayed a later time. At the same time, a high-IRQ-rate event can be unmasked, such that the delivery of the IRQs is immediate. An event is a low-IRQ-rate event if the event causes IRQs to be generated at a rate that is lower than a threshold. The threshold may be predetermined or dynamically determined.

Throughout the following description, the term "device" is used to refer to a physical hardware device or a software device. The term "event" refers to an interrupt triggered by the operation of a device. For example, an event occurs when a key on a keyboard is pressed. When the event occurs, the keyboard sends an IRQ to require the attention of the processor.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
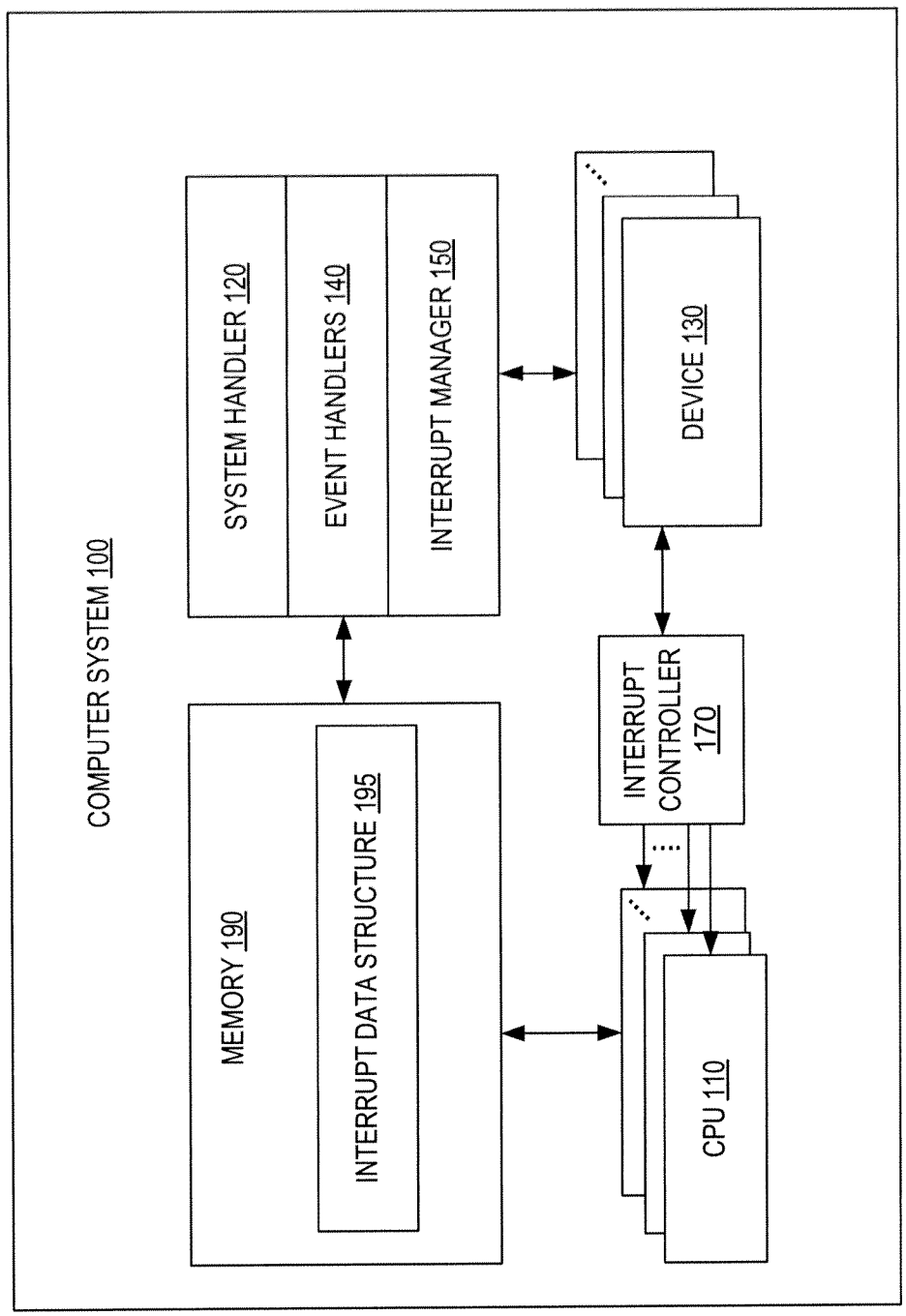
FIG. 1 is a block diagram of a computer system in which embodiments of the invention may operate.

FIG. 1 is a block diagram that illustrates an embodiment of a computer system 100 in which embodiments of the present invention may operate. The computer system 100 includes one or more central processing units (CPUs) 110, memory 190 and hosts a plurality of devices 130. The devices 130 may be internal to the computer system 100, or externally coupled to the computer system 100. The devices 130 may include hardware devices and software devices. Examples of the devices include network interface cards (NICs), storage devices, sound or video adaptors, photo/video cameras, printer devices, keyboards, displays, etc. The computer system 100 may be a server, a workstation, a personal computer (PC), a mobile phone, a palm-sized computing device, a personal digital assistant (PDA), etc.

During operation, an event may be triggered by the operation of the device 130. The device 130 can report the event by sending an interrupt request (IRQ) to one of the CPUs 110 via an interrupt controller 170. The IRQ is sent with an interrupt vector that is assigned to the event. The IRQ is passed to a system handler 120, which consults an interrupt data structure 195 in the memory 190, using the interrupt vector as an index. The interrupt data structure 195 associates the interrupt vector with one or more event handlers 140. Each event handler 140 handles an individual event by causing the CPU 110 to execute event handling code to perform appropriate operations. If the triggered event is allocated with a dedicated interrupt vector, the interrupt data structure 195 associates the dedicated interrupt vector with only one event handler 140 that handles the triggered event. If the triggered event is allocated with a shared interrupt vector, the interrupt data structure 195 associates the shared interrupt vector with multiple event handlers 140, each of which handles an event that is allocated with the shared interrupt vector.

According to one embodiment of the present invention, an interrupt vector is allocated to one event (and, therefore, one event handler) when the activities of the event are above a threshold rate. If the activities of the event fall below a threshold rate, the interrupt vector allocated to the event will be shared by one or more other events. In one embodiment, the computer system 100 includes an interrupt manager 150, which monitors and measures the rate at which IRQs are generated as a result of the occurrences of each event. The event manager 150 also manages the allocation of interrupt vectors and updates the interrupt data structure 195 when there is a change to the allocation of interrupt vectors. Operations of the interrupt manager 150 will be described in greater detail below in connection with FIGS. 2-5.

FIG. 2A illustrates an embodiment of the interrupt data structure 195 and the interrupt manager 150. In one embodiment, the interrupt data structure 195 is indexed by interrupt vectors, allowing the system handler 120 to use interrupt vectors to locate pointers to the corresponding event handlers 140. A shared interrupt vector is associated with multiple event handlers 140 and a dedicated interrupt vector is associated with one event handler 140. In one embodiment, the interrupt manager 150 monitors the IRQs associated with an event that are sent in a time interval, using a counter 240 to count the number of IRQs in the time interval. Periodically, the interrupt manager 150 uses a comparator 220 to compare the counter value associated with the event to a threshold 210. If the counter value is greater than the threshold 210, it indicates that a dedicated interrupt vector should be allocated to the event. If the counter value is below the threshold 210, it indicates that a shared interrupt vector should be allocated to the event. The interrupt manager 150 performs the event monitoring, IRQ counting, and comparing operations for each of the different kinds of events that the computer system 100 generates.

In one embodiment, the threshold 210 may be a fixed value or a dynamically adjustable value. In one embodiment, the threshold 210 is dynamically determined based on the total number of different kinds of events in the computer system 100, the number of unallocated interrupt vectors, and the current load of the CPU 110 that is to execute the event-handling code.

In one embodiment, the interrupt manager 150 determines the allocation of interrupt vectors based on pre-defined rules. The rules share the same feature that an event incurring a high rate of IRQs is allocated with a dedicated interrupt vector, and an event incurring a low rate of IRQs shares the same interrupt vectors with one or more other low-IRQ-rate events. The number of events sharing the same interrupt vector may depend on the IRQ rate of each of these events. For example, an event that occurs every 100 microseconds (on average) may share an interrupt vector with a larger number of events than an event that occurs every 1 microsecond (on average).

A number of alternative embodiments exist for identifying the occurrence of an event from multiple events that share the same interrupt vector. FIG. 2B illustrates a device data structure 230 that is maintained in each device 130. The device data structure 230 allows the computer system 100 to identify the occurrence of an event when the event shares an interrupt vector with one or more other events.

Referring to FIG. 2B, in one embodiment, each device 130 maintains the device data structure 230 to record one or more interrupt vectors allocated to the one or more events triggered by the operation of the device 130. Each interrupt vector is associated with an event identifier and a mask (e.g., a 1-bit mask). In some embodiments, a pending bit is also associated with the mask. When the mask is set, the device 130 is prohibited from sending an IRQ to report the occurrence of the associated event. When the event occurs and the mask is set, the device 130 may set the pending bit to take note of the pending event. The interrupt manager 150 periodically checks each event to determine whether the event is pending. When the interrupt manager 150 determines, from the set pending bit, that the event is pending, the interrupt manager 150 clears the mask to allow the device 130 to send an IRQ with the shared interrupt vector to report the occurrence of the event. Once the IRQ is sent, the system handler 120 checks the interrupt data structure 195 to find the event handlers 140 that are associated with the shared interrupt vector. In one embodiment, all of the event handlers 140 are invoked upon delivery of the IRQ, but only the event handler 140 for the event that has its pending bit set will perform event-handling operations. The pending bit can be cleared after the appropriate event handler is identified. In embodiments where the pending bit does not exist or otherwise not used, the device 130 may set a flag, update a queue, or mark some other data structure to indicate the existence of a pending event that is masked from being reported.

In the embodiment of FIG. 2B, the interrupt manager 150 sets the mask for all of the events that share an interrupt vector. Periodically, each of these events has an opportunity of having its mask cleared if it has an IRQ pending to be sent. Thus, the use of masks can effectively allow multiple events to share the same interrupt vector. It is not necessary to mask a high-IRQ-rate event that is allocated with a dedicated interrupt vector. Thus, upon the occurrence of a high-IRQ-rate event, an IRQ with the dedicated interrupt vector can be sent immediately without delay.

In alternative embodiments, an interrupt vector may be shared among events without the use of masks. The mask may not exist in the device data structure 230 or otherwise not used. FIG. 2C illustrates a device data structure 250 without the mask. When an event occurs, the device 130 sends an IRQ with a shared interrupt vector. The device 130 keeps track of the occurrence of the event by setting a flag associated with the event or by other means that may be device and/or system specific. Once the IRQ is sent, the system handler 120 checks the interrupt data structure 195 to find the event handlers 140 that are associated with the shared interrupt vector. In one embodiment, all of the event handlers 140 are invoked, but only the event handler 140 for the outstanding event performs the event-handling operations. This event handler 140 can be identified from a previously-set flag or other device and/or system specific means.

When multiple event handlers are invoked as a result of IRQ delivery, the interrupt manager 150 checks each of the events associated with the invoked event handlers to identify the appropriate event handler. In one embodiment, each event is checked with the same frequency; e.g., in a pre-determined order. In an alternative embodiment, events are assigned different priorities, and the events are checked based on their priorities. For example, a higher priority event may be checked every X microsecond and a lower priority event may be checked every Y microsecond (X<Y). Alternatively, a higher priority event may be checked every X interrupts and a lower priority event may be checked every Y interrupts (X<Y).

In one embodiment, the interrupt manager 150 keeps track of the priority of each event. The priority of an event can be set according to its IRQ rate measured by the interrupt manager 150. When an event's IRQ rate falls below the threshold 210, the priority of the event is decreased. When an event's IRQ rate rises above the threshold 210, the priority of the event is increased. By using the priorities, an IRQ for an event having infrequent activities (and a lower priority) can be delayed to allow delivery of an IRQ for another event with more frequent activities (and a higher priority).

Figure 3:
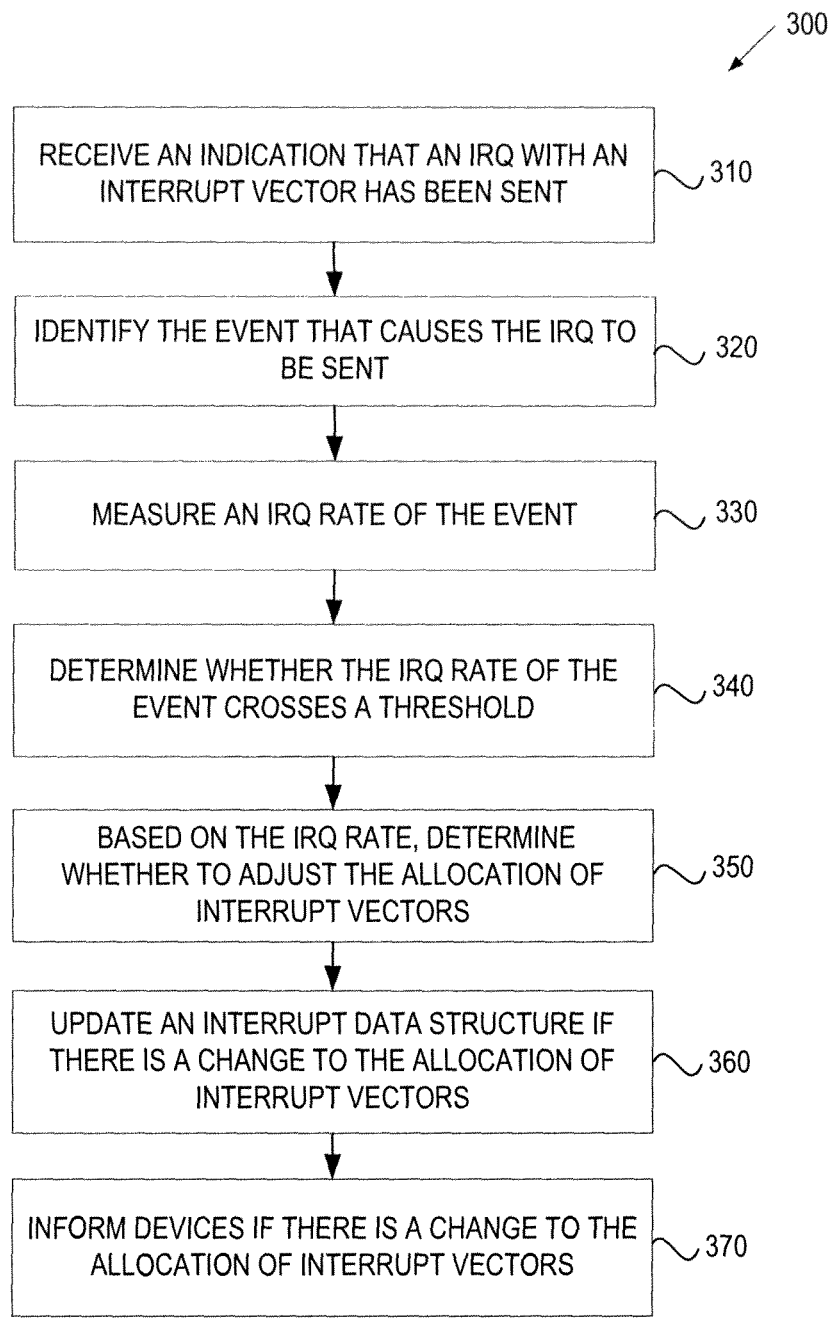
FIG. 3 is a flow diagram of one embodiment of a method for allocating interrupt vectors to events based on their rates of activities.

FIG. 3 is a flow diagram illustrating one embodiment of a method 300 for allocating interrupt vectors to events. The method 300 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 300 is performed by the interrupt manager 150 of FIG. 1.

Referring to FIG. 3, in one embodiment, the method 300 begins when the interrupt manager 150 receives an indication from a device that an event has occurred; e.g., an IRQ associated with the event has been sent (block 310). The event may be triggered by the operation of the device, which generates the IRQ to request service of a CPU. The interrupt manager 150 is able to identify which event causes the IRQ to be sent (block 320). Some embodiments for identifying the event that uses a shared interrupt vectors are described below in connection with FIGS. 4 and 5. If the event uses a dedicated interrupt vector, the interrupt manager 150 can readily identify the event from the dedicated interrupt vector and the interrupt data structure 195.

After the event is identified, the interrupt manager 150 measures the IRQ rate for the event (block 330). In one embodiment, upon receipt of the indication, the interrupt manager 150 increments a counter that counts the occurrences of the event in a fixed time interval. The interrupt manager 150 updates the IRQ rate of the event with the counter value when the time interval expires. The interrupt manager 150 then clears the counter for counting the number of IRQs in the next time interval. When the IRQ rate is updated, the interrupt manager 150 compares the updated IRQ rate with a threshold to determine whether the IRQ rate crosses the threshold (block 340). If the IRQ rate does not cross the threshold (e.g., remains higher than or lower than the threshold), no changes to the interrupt vector allocation is made. However, if the IRQ rate crosses the threshold, the interrupt manager 150 adjusts the interrupt vector allocated to the event (block 350).

In one embodiment, when the IRQ rate is below a threshold, the interrupt manager 150 increases the number of events that share an interrupt vector with the current event. When the IRQ rate is above a threshold, the interrupt manager 150 reduces the number of events that share the same interrupt vector with the current event. In one embodiment, if the current event's IRQ rate is above a threshold, the event is allocated with a dedicated interrupt vector, which may be the same interrupt vector currently assigned to the event (all the other events sharing the same interrupt vector are reassigned a different vector), or a different interrupt vector than the interrupt vector currently assigned to the event. If there is a change to the allocation of the interrupt vectors, the interrupt manager 150 updates the interrupt data structure 195 to reflect the change (block 360); for example, the association between the interrupt vectors and event handlers needs to be updated. Further, the interrupt manager 150 informs the one or more devices affected by the changed allocation such that they can update their respective device data structures accordingly (block 370).

Figure 4:
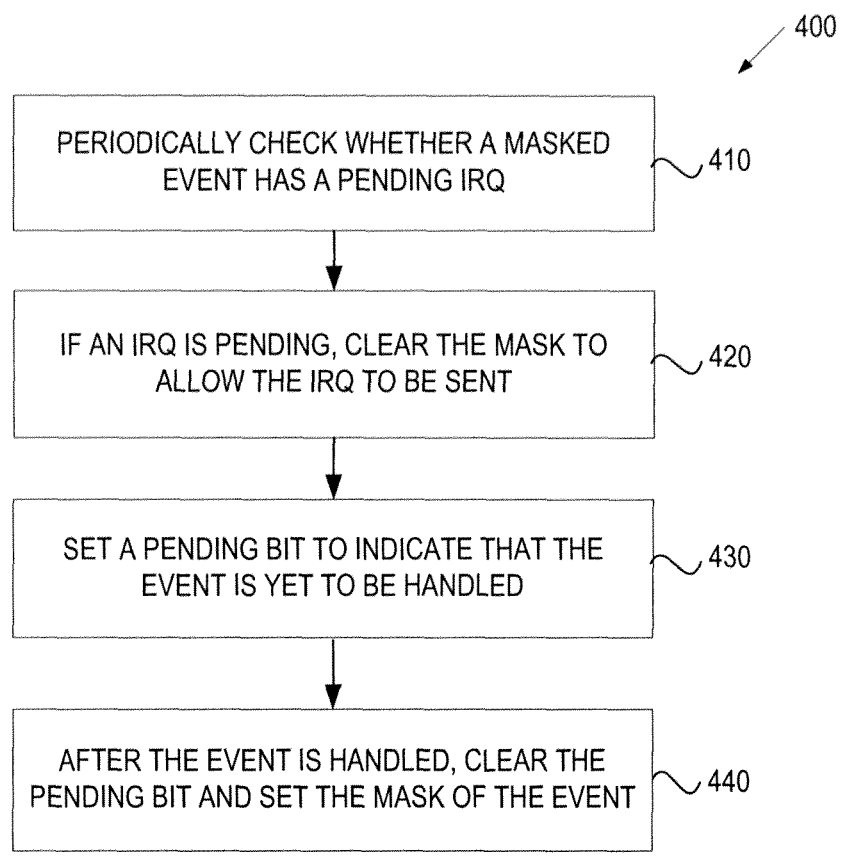
FIG. 4 is a flow diagram of one embodiment of a method for identifying the occurrence of an event from multiple events that share the same interrupt vector, where the multiple events are masked.

FIG. 4 is a flow diagram illustrating one embodiment of a method 400 for identifying the occurrence of an event from multiple events sharing the same interrupt vector, where the multiple events are masked as described above in connection with FIG. 2B. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 400 is performed by the interrupt manager 150 of FIG. 1.

Referring to FIG. 4, in one embodiment, the method 400 begins with the interrupt manager 150 periodically checking each masked event to determine whether an IRQ is pending to be sent (block 410). When the interrupt manager 150 identifies an event having a pending IRQ, the interrupt manager 150 clears the mask to allow the IRQ to be sent (block 420). The interrupt manager 150 then sets a pending bit or a different marker to indicate the event has occurred but yet to be handled (block 430). When the IRQ is sent, event handlers associated with the events sharing the same interrupt vector are invoked. Only the event handler associated with the event having the pending bit set performs the event-handling operations. The interrupt manager 150 then clears the pending bit and sets the mask for the event (block 440).

In one embodiment, the interrupt manager 150 can detect whether a condition that allows an IRQ to be sent is satisfied. In this embodiment, when the interrupt manager 150 identifies an event having a pending IRQ and that the pending IRQ can be sent, the interrupt manager 150 invokes the event handler to handle the interrupt. This embodiment can operate in a scenario in which masks are used. For example, the interrupt manager 150 masks an event when the IRQ rate of the event is below a threshold. When the interrupt manager 150 detects that an IRQ is pending on the device, the interrupt manager 150 invokes the event handler to handle the interrupt. The interrupt manager 150 also counts the instance of the event that just occurred. When the IRQ rate of the event is above a threshold, the event is unmasked.

Figure 5:
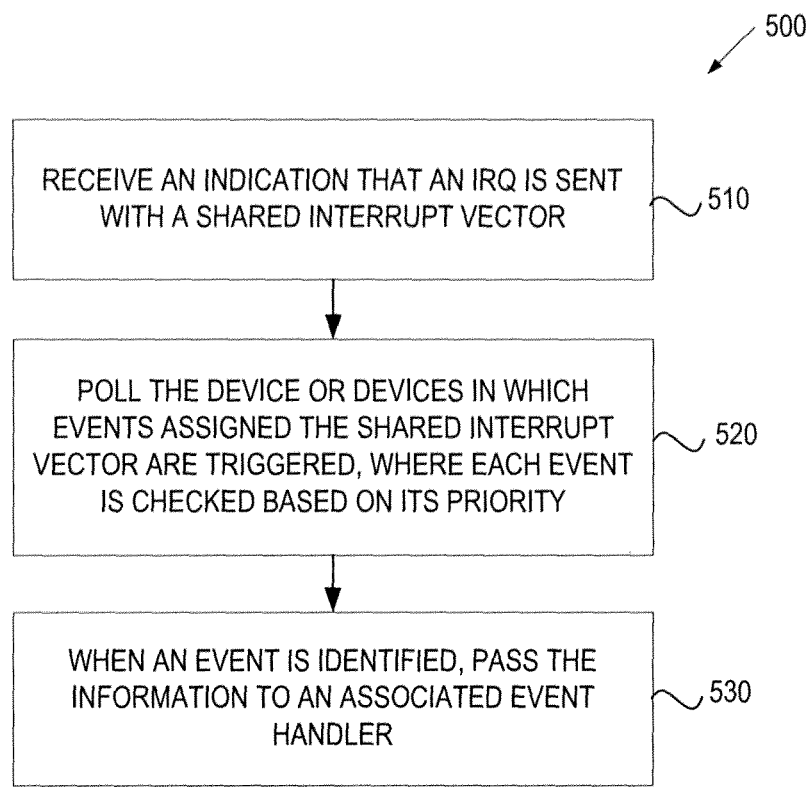
FIG. 5 is a flow diagram of one embodiment of a method for identifying the occurrence of an event from multiple events that share the same interrupt vector, where the multiple events are not masked.

FIG. 5 is a flow diagram illustrating one embodiment of a method 500 for identifying the occurrence of an event from multiple events sharing the same interrupt vector, where the multiple events are not masked as described above in connection with FIG. 2C. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the interrupt manager 150 of FIG. 1.

Referring to FIG. 5, in one embodiment, the method 500 begins when the interrupt manager 150 receives an indication that an IRQ is sent with a shared interrupt vector (block 510). The IRQ indicates that one of the multiple events sharing the interrupt vector has occurred. When the IRQ is sent, event handlers associated with these multiple events are invoked. To identify which one of the events has occurred, the interrupt manager 150 polls the device or devices in which these events are triggered to check whether any event is waiting to be handled (block 520). In one embodiment, the interrupt manager 150 checks each of the events with a different frequency based on its priority as described above in connection with FIG. 2C. Thus, the interrupt manager 150 may skip a low-priority event in this round of checking and its event handling may be delayed until the occurrence of the event is identified in a later run of checking. The interrupt manager 150 may check a high-priority event every time an IRQ is sent with an interrupt vector assigned to the high-priority event. In one embodiment, the interrupt manager 150 checks whether an event has occurred by checking a flag or other data structure associated with the event. When the event is identified, the information is passed to the associated event handler to perform appropriate event-handling operations (block 530).

Figure 6:
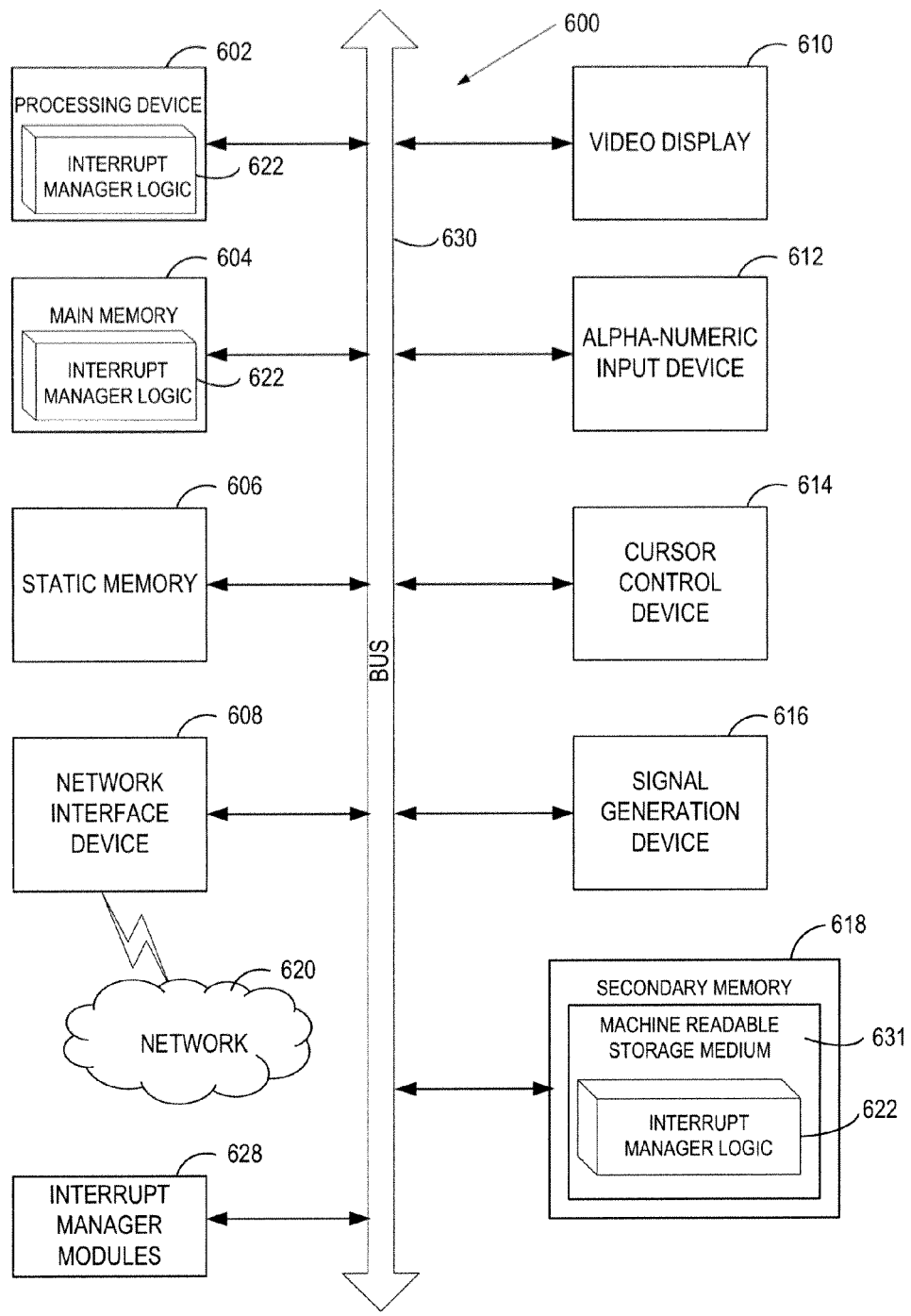
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute interrupt manager logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., interrupt manager logic 622) embodying any one or more of the methodologies or functions described herein (e.g., the interrupt manager 150 of FIG. 1). The interrupt manager logic 622 may also reside, completely or at least partially, within the main memory 604 and/or within the processing device 602 during execution thereof by the computer system 600; the main memory 604 and the processing device 602 also constituting machine-readable storage media. The interrupt manager logic 622 may further be transmitted or received over a network 620 via the network interface device 608.

The machine-readable storage medium 631 may also be used to store the interrupt manager logic 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include interrupt manager modules 628 for implementing the functionalities of the interrupt manager 150 of FIG. 1. The module 628, components and other features described herein (for example in relation to FIG. 1) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "measuring", "determining", "updating", "checking", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   measuring, by a processor in a computer system, a first rate of activities for a first event in the computer system that occur over a first interval of time and a second rate of activities for a second event in the computer system that occur over a second interval of time;
   choosing to allocate a dedicated interrupt vector to the first event in view of the first rate of activities, wherein the dedicated interrupt vector is not shared with other events in the computer system; and
   choosing to allocate a shared interrupt vector to the second event in view of the second rate of activities, wherein the shared interrupt vector is shared with other events in the computer system.

2. The method of claim 1, wherein the first rate of activities is a number of interrupt requests for the first event that occur over the first interval of time, and wherein the second rate of activities is a number of interrupt requests for the second event that occur over the second interval of time.

3. The method of claim 1, further comprising:
   determining that the second rate of activities is below a threshold, wherein choosing to allocate the shared interrupt vector to the second event is in view of the determination that the second rate of activities is below the threshold.

4. The method of claim 1, further comprising:
   determining that the second rate of activities is below a threshold;
   masking the second event in view of the determination that the second rate of activities is below the threshold;
   detecting a pending interrupt request for the second event; and
   unmasking the second event to allow delivery of the pending interrupt request in view of the detection of the pending interrupt request.

5. The method of claim 1, further comprising:
   determining that the second rate of activities is below a first threshold;
   masking the second event in view of the determination that the second rate of activities is below the first threshold;
   detecting a pending interrupt request for the second event;
   updating the second rate of activities in view of the detection of the pending interrupt request;
   determining that the updated second rate of activities is above a second threshold; and
   unmasking the second event in view of the determination that the updated second rate of activities is above the second threshold.

6. The method of claim 1, further comprising:
   assigning a priority to the second event in view of the second rate of activities; and
   adjusting how often the second event is checked for event handling in view of the priority.

7. The method of claim 1, further comprising:
   determining that the second rate of activities is below a threshold; and
   increasing a number of events that share the shared interrupt vector with the second event in view of the determination that the second rate of activities is below the threshold.

8. The method of claim 1, further comprising:
   determining that the second rate of activities is above a threshold; and
   reducing a number of events that share the shared interrupt vector with the second event in view of the determination that the second rate of activities is above the threshold.

9. A computer system comprising:
   memory to store an interrupt vector table that is indexed by interrupt vectors; and
   a processor, coupled to the memory, to measure a first rate of activities for a first event in the computer system that occur over a first interval of time and a second rate of activities for a second event in the computer system that occur over a second interval of time, choose to allocate a dedicated interrupt vector to the first event in view of the first rate of activities, wherein the dedicated interrupt vector is not shared with other events in the computer system, and to choose to allocate a shared interrupt vector to the second event in view of the second rate of activities, wherein the shared interrupt vector is shared with other events in the computer system.

10. The system of claim 9, wherein the first rate of activities is a number of interrupt requests for the first event that occur over the first interval of time, and wherein the second rate of activities is a number of interrupt requests for the second event that occur over the second interval of time.

11. The system of claim 9, wherein the processor is further to determine that the second rate of activities is below a threshold, and to choose to allocate the shared interrupt vector to the second event in view of the determination that the second rate of activities is below the threshold.

12. The system of claim 9, wherein the processor is further to determine that the first rate of activities is above a threshold, and to choose to allocate the dedicated interrupt vector to the first event in view of the determination that the first rate of activities is above the threshold.

13. The system of claim 9, wherein the processor is further to determine that the second rate of activities is below a threshold, to mask the second event in view of the determination that the second rate of activities is below the threshold, to detect a pending interrupt request for the second event, and to unmask the second event to allow delivery of the pending interrupt request in view of the detection of the pending interrupt request.

14. The system of claim 9, wherein the processor is further to assign a priority to the second event in view of the second rate of activities, and to adjust how often the second event is checked for event handling in view of the priority.

15. A non-transitory computer readable storage medium including instructions that, when executed by a processor in a computer system, cause the processor to perform operations comprising:
    measuring, by the processor, a first rate of activities for a first event in the computer system that occur over a first interval of time and a second rate of activities for a second event in the computer system that occur over a second interval of time;
    choosing to allocate a dedicated interrupt vector to the first event in view of the first rate of activities, wherein the dedicated interrupt vector is not shared with other events in the computer system; and
    choosing to allocate a shared interrupt vector to the second event in view of the second rate of activities, wherein the shared interrupt vector is shared with other events in the computer system.

16. The non-transitory computer readable storage medium of claim 15, wherein the first rate of activities is a number of interrupt requests for the first event that occur over the first interval of time, and wherein the second rate of activities is a number of interrupt requests for the second event that occur over the second interval of time.

17. The non-transitory computer readable storage medium of claim 15, wherein the operations further comprise:
    determining that the second rate of activities is below a threshold, wherein choosing to allocate the shared interrupt vector to the second event is in view of the determination that the second rate of activities is below the threshold.

18. The non-transitory computer readable storage medium of claim 15, wherein the operations further comprise:
    determining that the second rate of activities is below a threshold;
    masking the second event in view of the determination that the second rate of activities is below the threshold;
    detecting a pending interrupt request for the second event; and
    unmasking the second event to allow delivery of the pending interrupt request in view of the detection of the pending interrupt request.

19. The non-transitory computer readable storage medium of claim 15, wherein the operations further comprise:
    determining that the second rate of activities is below a first threshold;
    masking the second event in view of the determination that the second rate of activities is below the first threshold;
    detecting a pending interrupt request for the second event;
    updating the second rate of activities in view of the detection of the pending interrupt request;
    determining that the updated second rate of activities is above a second threshold; and
    unmasking the second event in view of the determination that the updated second rate of activities is above the second threshold.

20. The non-transitory computer readable storage medium of claim 15, wherein the operations further comprise:
    assigning a priority to the second event in view of the second rate of activities; and
    adjusting how often the second event is checked for event handling in view of the priority.

21. The non-transitory computer readable storage medium of claim 15, wherein the operations further comprise:
    determining that the second rate of activities is below a threshold; and
    increasing a number of events that share the shared interrupt vector with the second event in view of the determination that the second rate of activities is below the threshold.

22. The non-transitory computer readable storage medium of claim 15, wherein the operations further comprise:
    determining that the second rate of activities is above a threshold; and
    reducing a number of events that share the shared interrupt vector with the second event in view of the determination that the second rate of activities is above the threshold.

* * * * *